US012665283B1

(12) United States Patent
Dotson, Jr. et al.

(10) Patent No.: US 12,665,283 B1
(45) Date of Patent: Jun. 23, 2026

(54) MOUNTING SYSTEM FOR USE ON A SUPPORT STRUCTURE

(71) Applicant: Chiquita F. Douglas, Apex, NC (US)

(72) Inventors: James William Dotson, Jr., Littleton, NC (US); Mildred J. Dotson, Littleton, NC (US); Michael L. Douglas, Apex, NC (US); Chiquita F. Douglas, Apex, NC (US)

( * ) Notice: Subject to any disclaimer, the term of this patent is extended or adjusted under 35 U.S.C. 154(b) by 0 days.

(21) Appl. No.: 19/178,545

(22) Filed: Apr. 14, 2025

(51) Int. Cl.
*H01Q 1/12* (2006.01)

(52) U.S. Cl.
CPC ................................. *H01Q 1/1207* (2013.01)

(58) Field of Classification Search
CPC .......... H01Q 1/12; H01Q 1/1207; H01Q 1/44; B23Q 37/00; F16M 13/00; F16M 13/02
See application file for complete search history.

(56) References Cited

U.S. PATENT DOCUMENTS

| | | | | |
|---|---|---|---|---|
| 6,986,489 B2 * | 1/2006 | Oddsen, Jr. | F16M 11/24 248/316.1 |
| 10,667,505 B2 * | 6/2020 | Matteo | A01K 89/016 |
| 11,396,076 B2 * | 7/2022 | Baker | B23Q 5/40 |
| 11,495,269 B2 * | 11/2022 | Morrison | H04R 1/026 |
| 2015/0021058 A1 * | 1/2015 | Devloo | A01B 71/08 172/559 |

* cited by examiner

*Primary Examiner* — Hasan Islam
(74) *Attorney, Agent, or Firm* — Ashley D. Johnson; Dogwood Patent and Trademark Law

(57) ABSTRACT

The invention is an improved mounting system that can be installed on a support structure, such as a water tank or water tower. The system includes a series of mounting discs and associated brackets cooperate to attach each disc to an antenna. The antenna is then coupled with a mounting pole an attached to a support structure for use. Advantageously, the mounting structures maintain their mechanical integrity, even after long periods of use and exposure to weather elements (rain, wind, snow, sleet). As a result, the disclosed system can effectively extend the life of the mounting poles by preventing rust and associated deterioration seen with current mounting systems.

20 Claims, 6 Drawing Sheets

Fig,. 3a

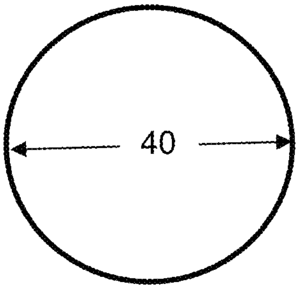
Fig. 4a
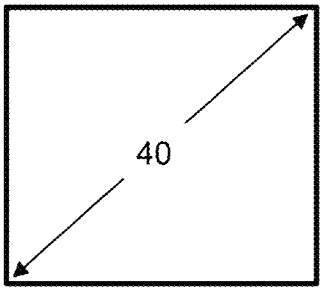
Fig. 4b
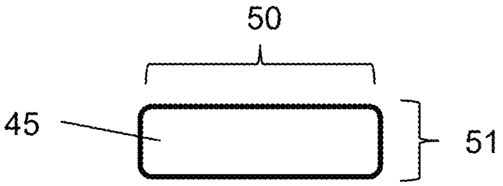
Fig. 5a
Fig. 5b
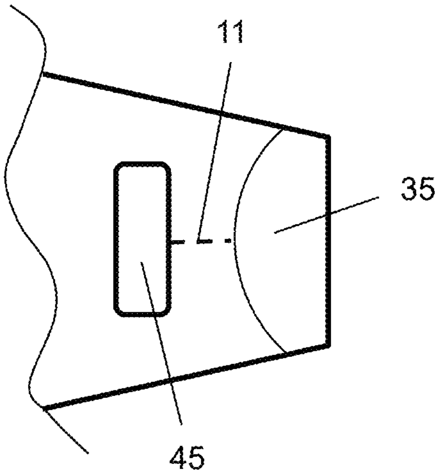

MOUNTING SYSTEM FOR USE ON A SUPPORT STRUCTURE

FIELD OF THE INVENTION

The presently disclosed subject matter relates to an improved mounting system that can be installed on a support structure, such as a water tower. The presently disclosed subject matter also relates to methods of making and using the improved mounting system.

BACKGROUND OF THE INVENTION

Water towers are elevated structures that support a water tank constructed at a height sufficient to pressurize an associated distribution system for potable water. Water towers are often also used to provide emergency storage for fire protection. Often, water towers operate in conjunction with underground or surface reservoirs that store treated water close to where it will be used. Due to the height of water towers, equipment from communication and electrical installations (e.g., antennas) are conventionally attached to a top, side, and/or railing of the water tower, as shown in FIG. 1. For example, the placement of cell antennas atop municipal water towers is a common practice, providing cities and townships with lease payments and cell phone companies with service.

However, the mounting systems currently used to attach antennas to the support structures often produce large amounts of rust. The rust is not only esthetically unsightly, but it also causes structural damage to the corrals and mounting pipes located on top of the water towers. Specifically, serrated stainless steel clamps are conventionally attached to the antenna mounting pipes. The serrated clamps prevent the antennas from moving or twisting, such as during high wind conditions. However, during installation the serrated clamps cut through the barrier coating on the steel antenna mounting pipes, producing a galvanic reaction due to the dissimilar metals. As a result, rust is produced which weakens the connection between prior art mounting systems and the antenna mounting pipes.

It would therefore be desirable to produce an improved mounting system that overcomes the shortcomings of the prior art.

SUMMARY OF THE INVENTION

In some embodiments, the presently disclosed subject matter is directed to a mounting system comprising a mounting disc and a mounting bracket. The mounting disc is defined by a top surface and an opposed bottom surface, with a sidewall therebetween. The mounting disc includes a central aperture positioned in the approximate midpoint (e.g., center) of the mounting disc that extends through a thickness of the mounting disc. The mounting disc further includes a plurality of disc apertures positioned equidistantly around the central aperture, each disc aperture extending through the thickness of the mounting disc. The mounting bracket can be an L-shaped bracket defined by an attachment arm and a connector arm. The attachment arm comprises a central aperture that aligns with the mounting disc central aperture when the mounting disc and the mounting bracket are overlayed. The term “overlayed” refers to a relationship in which one element is applied over or adjacent to another element (e.g., directly contacting). The attachment arm comprises a plurality of mounting apertures positioned about the mounting bracket central aperture, wherein some or all of the bracket mounting apertures align with the disc apertures when the mounting disc and the mounting bracket are overlayed.

In some embodiments, the system comprises a plurality of mounting discs and a plurality of mounting brackets (e.g., 10, 50, 100, or more of each).

In some embodiments, the mounting disc central aperture has a diameter of about 5-20 inches.

In some embodiments, the mounting disc has 8 mounting apertures.

In some embodiments, each mounting disc mounting aperture has a length and width of about 0.5 to 5 inches.

In some embodiments, each mounting disc mounting aperture is positioned at a distance of about 1-10 inches from the mounting disc central aperture and about 1-10 inches from each adjacent mounting disc mounting aperture.

In some embodiments, the mounting disc has a length and width of about 5-50 inches and a thickness of about 0.5-5 inches.

In some embodiments, the attachment arm central aperture has a diameter of about 5-20 inches.

In some embodiments, the attachment arm has 8 mounting apertures.

In some embodiments, each attachment arm mounting aperture has a length and width of about 0.5 to 5 inches.

In some embodiments, the attachment arm has a length and width of about 10-50 inches and the connector arm has a length of about 1-25 inches and a width of about 10-30 inches.

In some embodiments, the mounting bracket arms have a thickness of about 0.5-5 inches.

In some embodiments, the mounting disc and mounting bracket are constructed from steel or stainless steel.

In some embodiments, the system includes a plurality of bolts or screws sized and shaped to pass through the aligned attachment arm apertures and mounting disc apertures. The term “bolt” refers to a device comprising a shaft, such as a metal rod or pin, for fastening objects together. A bolt includes a head at one end and a screw thread at the other and is secured by a nut or a complimentary threaded portion in a device or object. The term “screw” refers to refers to any object having a continuous spiral protrusion or functionally equivalent set of protrusions extending outwardly from a surface thereon.

In some embodiments, the presently disclosed subject matter is directed to a method of attaching an element to a support structure. Specifically, the method comprises positioning the central aperture of the disclosed mounting disc about the exterior of the element. The method also includes positioning the central aperture of a first mounting bracket attachment arm about the exterior of the element and adjacent to the first mounting disc such that the mounting disc apertures are aligned with the attachment arm mounting apertures. The method comprises positioning a mechanical attachment through each aligned mounting disc aperture and attachment arm mounting aperture to join the first mounting disc to the first mounting bracket. The method includes attaching the connector arm of the first mounting bracket to a support pole (e.g., using any conventional attachment mechanism such as a fastener). The method comprises repeating the positioning and attaching steps a desired number of times to attach a desired number of mounting discs and mounting brackets about the element and to the support pole. The method includes attaching the support pole to the support structure, whereby the element is attached to the support structure.

In some embodiments, the support structure is a water tower.

In some embodiments, the element is an antenna.

In some embodiments, the mounting brackets and mounting disc are equally spaced along a length of the element, relative to adjacent mounting brackets and mounting discs.

BRIEF DESCRIPTION OF THE DRAWINGS

FIG. 3*a* is a perspective view of a system mounting disc in accordance with some embodiments of the presently disclosed subject matter.

FIGS. 4*a* and 4*b* are top plan views of disc central apertures in accordance with some embodiments of the presently disclosed subject matter.

FIG. 5*a* is a top plan view of a disc mounting aperture in accordance with some embodiments of the presently disclosed subject matter.

FIG. 5*b* is a fragmentary top plan view of a mounting aperture and central aperture on a mounting disc in accordance with some embodiments of the presently disclosed subject matter.

DETAILED DESCRIPTION OF THE INVENTION

Figure 1:
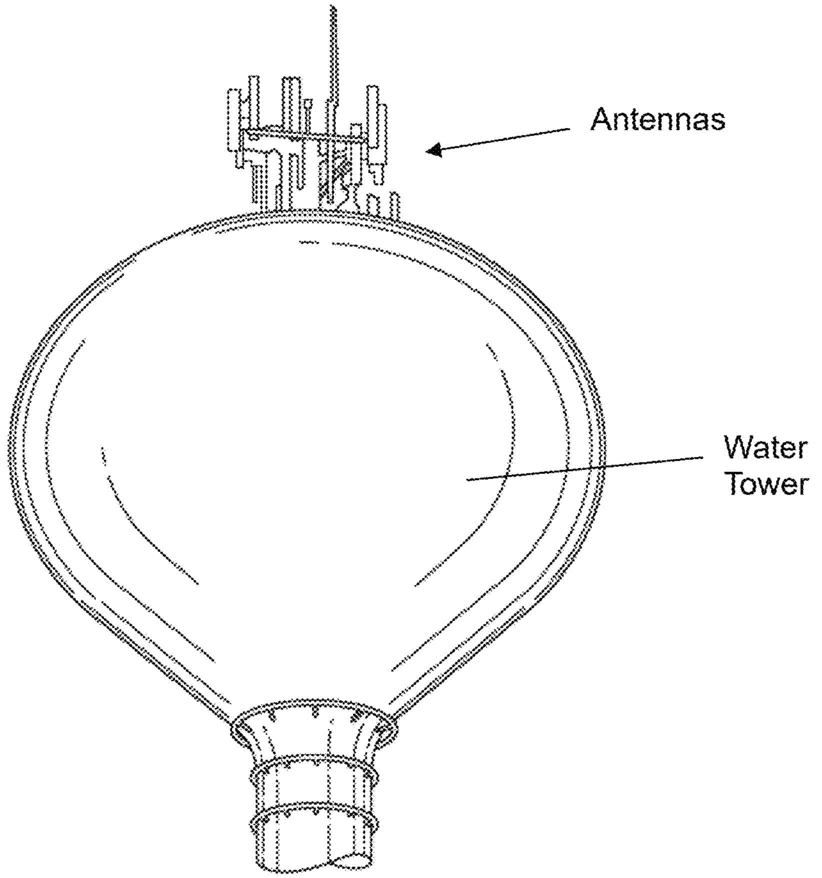
Fig. 1 PRIOR ART
FIG. 1 is a perspective view of a prior art water tower comprising a series of antennas on a top surface.

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

The presently disclosed subject matter is directed to an improved mounting system that can be installed on a support structure, such as a water tower or other tall structure. The term "support structure" therefore includes any elevated structure capable of supporting a mounting system for an antenna. Suitable support structures can include (but are not limited to) water towers, telephone poles, buildings, and the like. The term "water tower" refers to an elevated structure (e.g., with a height of at least about 130, 140, 150, or 160 feet) that supports a tank housing a volume of water. The water tower relies on hydrostatic pressure produced by the elevation of the water (e.g., due to gravity) to push the water into domestic and industrial water systems. Water towers therefore serve as a reservoir to help with water needs during peak usage times, and water is pumped back into the tower interior to refill the water levels as needed.

Figure 2:
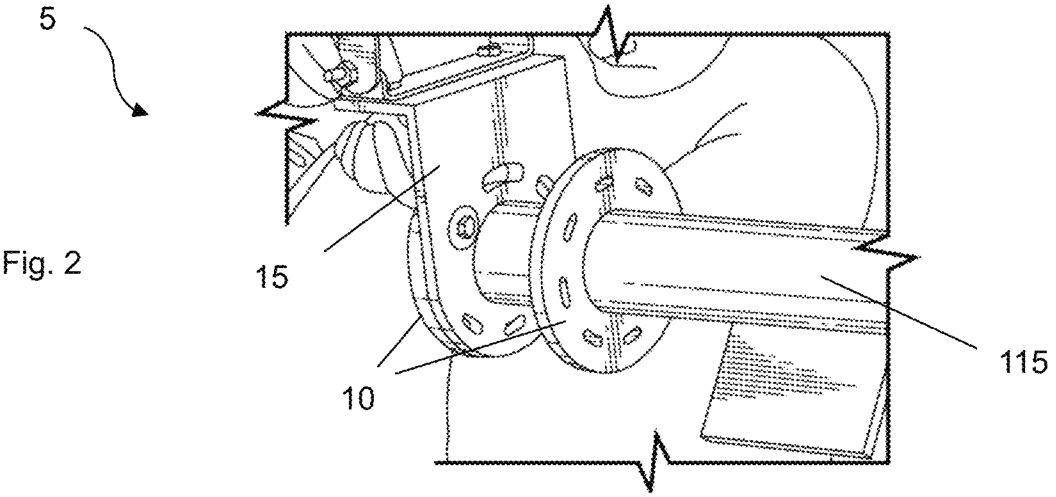
FIG. 2 is a perspective view of the mounting system in accordance with some embodiments of the presently disclosed subject matter.

FIG. 2 illustrates one embodiment of mounting system 5 that can be used to attach a first element (e.g., antenna 115) to a supporting structure, such as a water tower. As shown, the system includes a series of mounting discs 10 and brackets 15 that are used to attach each disc to an associated antenna mounting pole. The mounting pole is not part of the system. Advantageously, each bracket is attached to an associated mounting disc using a mechanical element, such as bolts, screws, rivets, clips, fasteners, and the like. Similarly, each bracket 15 is also attached to a corresponding mounting pipe using mechanical attachments, such as bolts, screws, and the like. The mounting pipe is physically attached to at least one surface of the water tower. In this way, the antenna mounting structures maintain their mechanical integrity, even after long periods of use and exposure to weather elements (rain, wind, snow, sleet). As a result, the disclosed system can effectively extend the life of the mounting poles and the associated mounting structures by preventing rust and associated deterioration observed with current mounting systems.

Figure 3B:
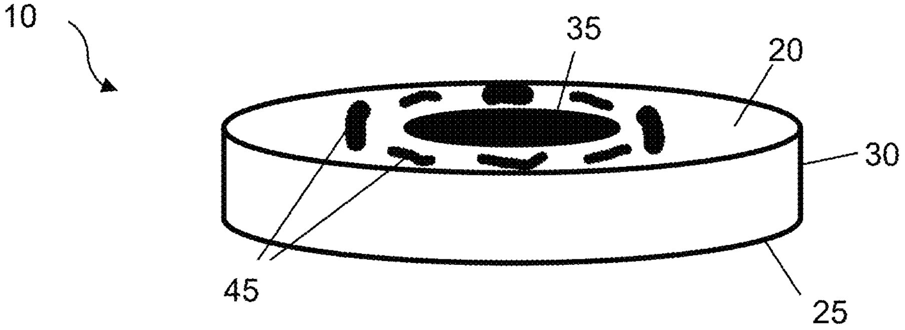
FIG. 3*b* is a top plan view of a system mounting disc in accordance with some embodiments of the presently disclosed subject matter.
Figure 3B:
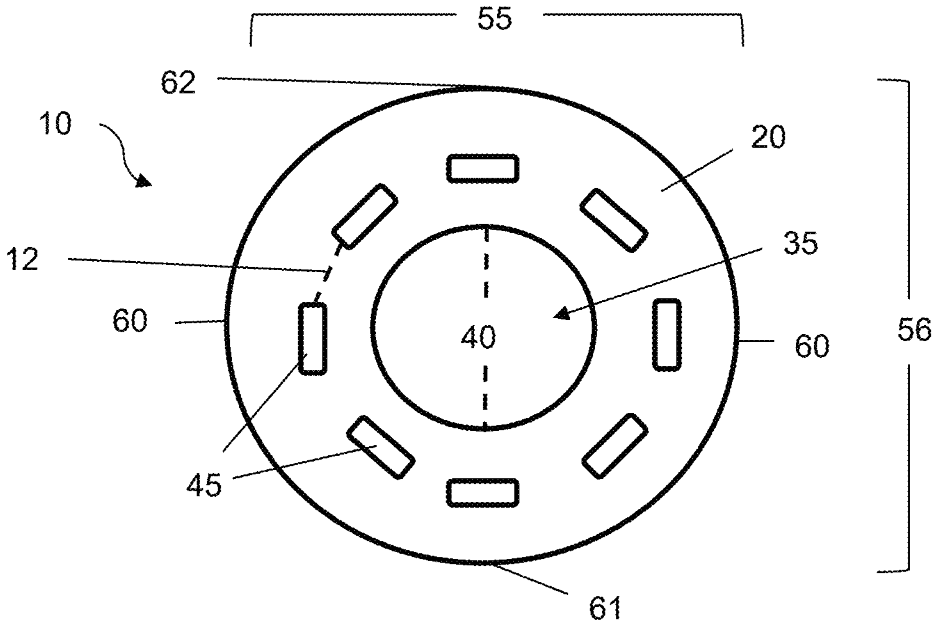
Figure 3C:
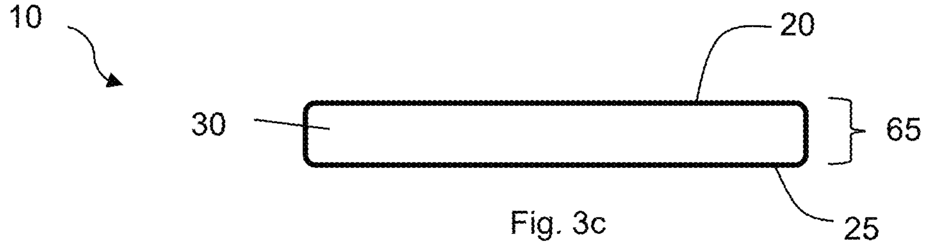
FIG. 3*c* is a side plan view of system mounting disc in accordance with some embodiments of the presently disclosed subject matter.

FIGS. 3*a*-3*c* illustrate one embodiment of mounting disc 10 comprising top side 20 and opposed bottom side 25. The term "disc" can refer to a circular object having a uniform thickness between two opposing flat sides of equal diameter. Each mounting disc also includes sidewall 30 that extends about the circumference of the disc. As shown, each mounting disc includes central aperture 35 that extends through the thickness of the disc. The term "aperture" refers to any kind of opening, such as a hole, gap, slit or cleft in any form or shape. The central aperture allows for attachment of a corresponding antenna (e.g., the disc is attached around the outer circumference of the antenna using any conventional method). The central aperture is the same shape as the corresponding antenna (e.g., circular or oval in some embodiments). The term "central" in relation to the term "central aperture" does not represent a location that always at a center (but in some embodiments can be positioned at a center). Thus, the center can be the middle point, as the point within a circle or sphere equally distant from all points of the circumference or surface, or the point within a regular polygon equally distant from the vertices.

The central aperture can have any dimensions, such as a diameter 40 of about 5-20 inches (e.g., at least/no more than about 5, 10, 15, or 20 inches). The term "diameter" refers to the longest straight-line distance that passes through the center of an element's cross section, as shown in FIGS. 4*a* and 4*b*. It should be appreciated that the presently disclosed subject matter is not limited and the dimensions of the central aperture can be greater or less than the range given above in some embodiments.

The mounting disc also includes a plurality of mounting apertures 45 that extend from top face 20 to bottom face 25 of each disc. Each mounting disc includes 8 mounting apertures in some embodiments that are equidistantly positioned around the central aperture 35. "Equidistantly" refers to the characteristic of being spaced equally close to each adjacent mounting aperture. Each mounting aperture can have length 50 and/or width 51 of about 0.5 to 5 inches in some embodiments (e.g., at least/no more than about 0.5, 1, 1.5, 2, 2.5, 3, 3.5, 4, 4.5, or 5 inches), as shown in FIG. 5*a*. Each mounting aperture can be rectangular in shape in some embodiments, although any shape can be used. Each mounting aperture 45 can also be about the same shape and size as the remainder of the mounting apertures.

Each mounting aperture can be positioned at a distance 11 about 1-10 inches (e.g., at least/no more than 1, 2, 3, 4, 5, 6, 7, 8, 9, or 10 inches from central aperture 35, as shown in FIG. 5*b*. In some embodiments, distance 11 can be the length perpendicular to the central aperture central point. Each mounting aperture can also be positioned at distance 12 of about 1-10 inches (e.g., at least/no more than about 1, 2, 3, 4, 5, 6, 7, 8, 9, or 10 inches) from each adjacent mounting aperture 45. In some embodiments, the distance between adjacent mounting apertures can be determined by the straight line distance from a first end of one mounting aperture to the closest end of an adjacent mounting aperture.

Mounting disc 10 can have any desired cross sectional shape, such as (but not limited to) circular, round, square, rectangular, triangular, pentagonal, hexagonal, octagonal, and the like. Any shape can be used.

The mounting disc can include length 55 and/or width 56 of about 10-50 inches in some embodiments, such as at least about (or no more than about) 10, 15, 20, 25, 30, 35, 40, 45, or 50 inches. The term "length" refers the longest straight line distance between disc side edges 60. The term "width" refers to the longest straight line distance between front and rear disc edges 61, 62.

Mounting disc 10 also includes thickness 65 of about 0.5-5 inches (e.g., at least/no more than about 0.5, 1, 1.5, 2, 2.5, 3, 3.5, 4, 4.5, or 5 inches). The term "thickness" refers to the distance between disc top and bottom faces 20, 25.

The length, width, and thickness ranges given above are representative only and are not meant to be limiting. Thus, the mounting disc can include a length, width, and/or thickness outside of the given ranges.

Figure 6A:
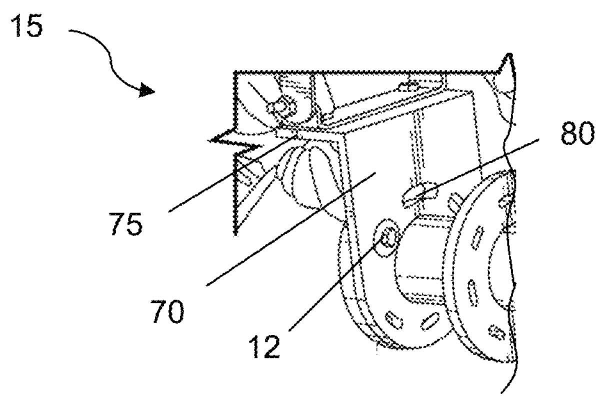
FIG. 6*a* is a perspective view of a system mounting bracket in accordance with some embodiments of the presently disclosed subject matter.
Figure 6B:
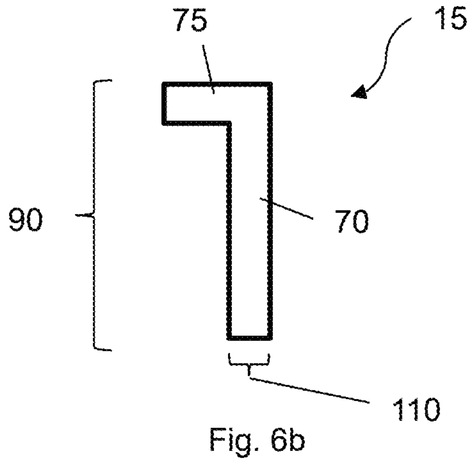
FIG. 6*b* is a side plan view of a system mounting bracket in accordance with some embodiments of the presently disclosed subject matter.

System 5 also includes mounting bracket 15 that cooperates with the mounting disc, as described in detail below. The term "bracket" generally refers to a bracing structure for coupling at least two elements together. FIGS. 6*a* and 6*b* illustrate one embodiment of L-shaped bracket 15 comprising attachment arm 70 that attaches to the mounting disc and connector arm 75 that attaches to the antenna mounting pole (or any supporting pole or item). "L-shaped" refers to a member with two arms extending from a corner. The angle between the two arms can be 150 degrees or less, such as 150, 135, 120, 90, 75, or 60 degrees. Thus, the two bracket arms can be perpendicular or substantially perpendicular to each other in some embodiments.

Attachment arm 70 includes a plurality of apertures 80 that align with one or more mounting disc apertures 45 when aligned. Thus, each disc aperture can align with a corresponding bracket aperture. Alternatively, only select disc apertures align with corresponding bracket apertures (not all). In this way, a bolt or other mechanical element 12 can attach the mounting disc to a corresponding mounting bracket by passing through the aligned apertures.

Figure 6C:
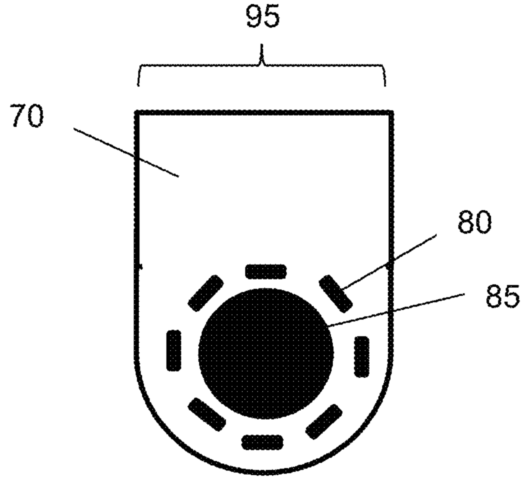
FIG. 6*c* is a front view of a mounting bracket attachment arm in accordance with some embodiments of the presently disclosed subject matter.

Attachment arm 70 also includes central aperture 85 sized and shaped to align with the central aperture in the mounting disc, as illustrated in FIG. 6*c*. The central aperture of the mounting bracket can have any dimensions, such as a diameter of about 5-20 inches (e.g., at least/no more than about 5, 10, 15, or 20 inches). It should be appreciated that the presently disclosed subject matter is not limited and the dimensions of the bracket central aperture can be greater or less than the range given above in some embodiments, so long as it cooperates with the central aperture of the mounting disc and can also fit around the exterior of an associated antenna or other structure.

The mounting bracket can include any number of mounting apertures 80 that extend through the mounting arm. For example, each mounting arm can include 8 mounting apertures in some embodiments that are equidistantly positioned around the central aperture 85. Thus, adjacent mounting apertures are spaced apart by a substantially equal distance (on both sides). Each mounting aperture 80 can have a length and/or width of about 0.5 to 5 inches in some embodiments (e.g., at least/no more than about 0.5, 1, 1.5, 2, 2.5, 3, 3.5, 4, 4.5, or 5 inches). Each mounting aperture 80 can be rectangular in shape in some embodiments, although any shape can be used. Each mounting aperture 80 can also be about the same shape and size and the remainder of the mounting apertures (or when compared to the disc apertures). In some embodiments, each mounting bracket on mounting arm 70 can have the size and shape and placement relative to the central aperture 85 such that the mounting bracket and mounting disc central apertures and mounting apertures are aligned when the two elements are overlayed.

In some embodiments, mounting arm 70 can have a length 90 and width 95 of about 10-50 inches in some embodiments, such as at least about (or no more than about) 10, 15, 20, 25, 30, 35, 40, 45, or 50 inches.

Figure 7:
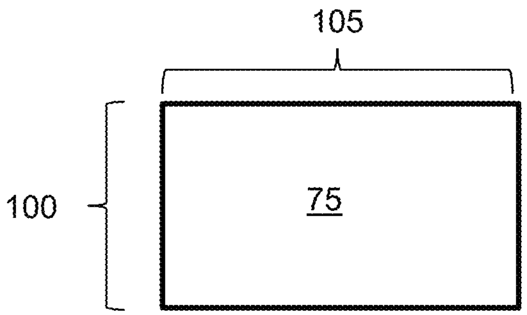
FIG. 7 is a top view of a mounting bracket connector arm in accordance with some embodiments of the presently disclosed subject matter.

As shown in FIG. 7, connector arm 75 can have length 100 of about 1-25 inches (e.g., at least/no more than about 1, 5, 10, 15, 20, or 25 inches) and a width 105 of about 10-30 inches in some embodiments, such as at least about (or no more than about) 10, 15, 20, 25, or 30 inches.

The mounting bracket arms also include thickness 110 of about 0.5-5 inches (e.g., at least/no more than about 0.5, 1, 1.5, 2, 2.5, 3, 3.5, 4, 4.5, or 5 inches).

Mounting bracket 15 and mounting disc 10 can be constructed from any suitable rigid material(s). The term “rigid” refers to a material that is stiff and does not stretch easily, and/or maintains very close to its original form after a force or pressure has been applied to it. Suitable materials can therefore include (but are not limited to) steel, stainless steel, titanium, titanium alloy, aluminum, or combinations thereof.

Figure 8A:
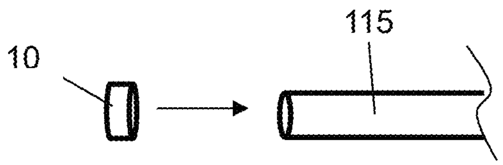
FIGS. 8*a*-8*c* illustrate one method of installing the system onto an antenna in accordance with some embodiments of the presently disclosed subject matter.
Figure 8B:
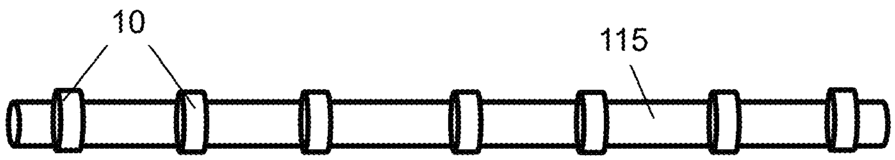

In use, the disclosed mounting system can be positioned on any supporting structure (e.g., water tower) to safely and securely pair an antenna or any other suitable element to the supporting structure. Specifically, a plurality of mounting discs can be positioned about the exterior of an antenna such that the antenna fits within central aperture 35, as shown in FIGS. 8*a* and 8*b*. Any number of mounting discs 10 can be positioned about the exterior of the antenna 115, such as about 10, 20, 30, 40, 50, or more.

Each mounting disc can be equally spaced relative to the adjacent mounting discs along the full or partial length of the antenna. For example, each mounting disc can be positioned a distance along the antenna of about 5-20 inches from the adjacent mounting discs (e.g., at least/no more than about 5, 10, 15, or 20 inches).

The term “antenna” refers to a structure that is capable of receiving an electromagnetic field and to converting it into a voltage or current. It should be appreciated that system 5 is not limited to use with an antenna, and any element to be coupled to a supporting structure can be used.

Figure 8C:
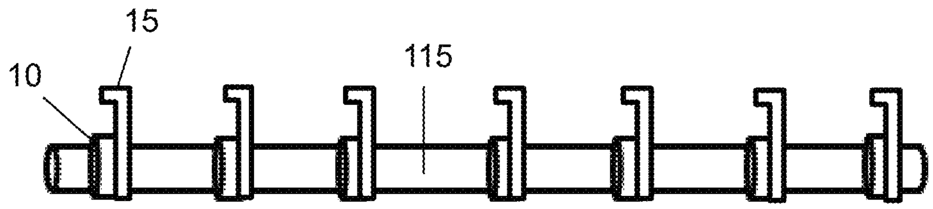

Mounting brackets 15 are also positioned around the exterior of antenna 15, aligning with each mounting disc as shown in FIG. 8*c*. Specifically, each bracket mounting aperture is aligned with one or more (or each) mounting aperture on the mounting disc. One or more bolts can extend through aligned mounting apertures 35, 80 to join the mounting bracket to the mounting disc, as shown in FIG. 6*a*. The mounting disc and the mounting bracket are thus joined together.

In some embodiments, the mounting discs and the mounting brackets are first aligned and attached together and then are positioned along the length of antenna 115.

Figure 9:
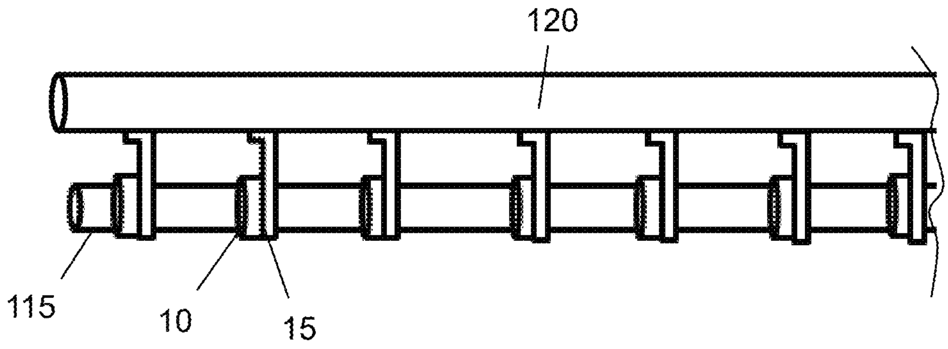
FIG. 9 illustrates one method of the disclosed system installed on an antenna support pole in accordance with some embodiments of the presently disclosed subject matter.
Figure 10:
FIG. 10 is a perspective view of a plurality of antennas positioned on a top surface of a support structure using the disclosed mounting system.

Each mounting bracket is then attached to a support structure, such as an antenna mounting pole 120, as shown in FIG. 9. Any coupling element can be used, such as any type of fastener. The coupled antenna and mounting pole can then be attached using any mechanism to a water tower or other structure using conventional mechanisms. For example, one end of the mounting pole can be attached to a desired location on a water tower, as shown in FIG. 10. Because the antenna is securely attached to mounting pole 120 using system 5, the antenna remains in position for a desired amount of time. Several elements can be positioned on the support structure, such as an antennae array that includes several support poles, each with an antenna mounted to it.

The disclosed mounting system offers many advantages over prior art systems. For example, the cooperation of the mounting bracket and mounting disc offers increased durability and reliability for attachment of antenna 115 and mounting pole 120.

The disclosed system further avoids the use of serrations or any similar elements that compromise the integrity of the antenna or the antenna mounting pole. In this way, rust or other degradation-related events are avoided, extending the life of the system.

The system offers an extended life when compared to prior art mounting structures, allowing users minimal or no maintenance over the life of the system.

The disclosed system offers a cost benefit to users, requiring minimal or no replacement costs due to rust or other degradation experienced in prior art systems.

Further, system 5 can be used with a wide variety of antennas or other elements that are to be mounted to a support structure.

System 5 is easy to use, such that even users with minimal instruction can easily and efficiently install the system on a support structure, such as a water tower.

The invention disclosed herein can be applied to different industries on new or existing vertical structures to make use of the vertical space previously unavailable or unsuitable.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A mounting system comprising:

a mounting disc defined by:

a top surface and an opposed bottom surface, with a sidewall therebetween;

a central aperture positioned in an approximate mid-point of the mounting disc that extends through a thickness of the mounting disc;

a plurality of disc apertures positioned equidistantly around the central aperture, each disc aperture extending through the thickness of the mounting disc; and an L-shaped mounting bracket defined by an attachment arm and a connector arm;

wherein the attachment arm comprises a central aperture that aligns with the mounting disc central aperture when the mounting disc and the L-shaped mounting bracket are overlayed;

wherein the attachment arm comprises a plurality of mounting apertures positioned symmetrically about the L-shaped mounting bracket central aperture; and wherein some or all of the mounting apertures align with the disc apertures when the mounting disc and the L-shaped mounting bracket are overlayed.

2. The system of claim 1, comprising a plurality of mounting discs and a plurality of mounting brackets.

3. The system of claim 1, wherein the mounting disc central aperture has a diameter of about 5-20 inches.

4. The system of claim 1, wherein the mounting disc has 8 mounting apertures.

5. The system of claim 1, wherein each mounting disc mounting aperture has a length and width of about 0.5 to 5 inches.

6. The system of claim 1, wherein each mounting disc mounting aperture is positioned at a distance of about 1-10 inches from the mounting disc central aperture and about 1-10 inches from each adjacent mounting disc mounting aperture.

7. The system of claim 1, wherein the mounting disc has a length and width of about 5-50 inches and a thickness of about 0.5-5 inches.

8. The system of claim 1, wherein the attachment arm central aperture has a diameter of about 5-20 inches.

9. The system of claim 1, wherein the attachment arm has 8 mounting apertures.

10. The system of claim 1, wherein each attachment arm mounting aperture has a length and width of about 0.5 to 5 inches.

11. The system of claim 1, wherein the attachment arm has a length and width of about 10-50 inches and the connector arm has a length of about 1-25 inches and a width of about 10-30 inches.

12. The system of claim 1, wherein the mounting bracket arms have a thickness of about 0.5-5 inches.

13. The system of claim 1, wherein the mounting disc and mounting bracket are constructed from steel or stainless steel.

14. The system of claim 1, further comprising a plurality of bolts or screws sized and shaped to pass through the aligned attachment arm apertures and mounting disc apertures.

15. The method of claim 1, wherein the mounting disc central aperture and the attachment arm central aperture each has a diameter of about 5-20 inches.

16. A method of attaching an element to a support structure, the method comprising:

positioning the central aperture of the mounting disc of the system of claim 1 about an exterior of the element;

positioning the central aperture of a first mounting bracket attachment arm about the exterior of the element and adjacent to the first mounting disc such that the mounting disc apertures are aligned with the attachment arm mounting apertures;

positioning a mechanical attachment through each aligned mounting disc aperture and attachment arm mounting aperture to join the first mounting disc to the first mounting bracket;

attaching the connector arm of the first mounting bracket to a support pole;

repeating the positioning and attaching steps a desired number of times to attach a desired number of mounting discs and mounting brackets about the element and to the support pole;

attaching the support pole to the support structure, whereby the element is attached to the support structure.

17. The method claim 16, wherein the support structure is a water tower.

18. The method of claim 16, wherein the element is an antenna.

19. The method of claim 16, wherein the mounting brackets and mounting disc are equally spaced along a length of the element, relative to adjacent mounting brackets and mounting discs.

20. The method of claim 16, wherein the mounting disc and mounting bracket are constructed from steel or stainless steel.

* * * * *